(12) United States Patent
Murakami (10) Patent No.: US 8,837,017 B2
(45) Date of Patent: Sep. 16, 2014

(54) IMAGE READING APPARATUS

(75) Inventor: Ayumu Murakami, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/290,829

(22) Filed: Nov. 7, 2011

(65) Prior Publication Data

US 2012/0113487 A1 May 10, 2012

(30) Foreign Application Priority Data

Nov. 10, 2010 (JP) ................................ 2010-251901

(51) Int. Cl.
*H04N 1/04* (2006.01)
(52) U.S. Cl.
USPC ............ 358/496; 358/488; 358/498; 358/486
(58) Field of Classification Search
None
See application file for complete search history.

(56) References Cited

U.S. PATENT DOCUMENTS

| | | | |
|---|---|---|---|
| 7,574,167 B2* | 8/2009 | Okamoto et al. | 399/395 |
| 8,497,913 B2* | 7/2013 | Yamazaki et al. | 348/208.15 |
| 2007/0242997 A1* | 10/2007 | Takahashi et al. | 399/395 |

FOREIGN PATENT DOCUMENTS

| | | |
|---|---|---|
| JP | H07-156476 A | 6/1995 |
| JP | H09-076592 A | 3/1997 |
| JP | 2003-137459 A | 5/2003 |
| JP | 2008-230759 A | 10/2008 |
| JP | 2009-51585 A | 3/2009 |

* cited by examiner

*Primary Examiner* — Cheukfan Lee
(74) *Attorney, Agent, or Firm* — Canon U.S.A., Inc., IP Division (57) ABSTRACT

An image reading apparatus includes a control unit that is configured to suspend an operation of a separation-feeding unit in a feeding operation when the control unit determines, based on a signal from a leading edge detecting unit, that an inclined amount of the leading edge of a fed document is larger than a setting value. The control unit is also configured to set, when a mixture of different widths is set to the setting unit, the setting value larger in comparison to a case where a mixture of different widths is not set.

3 Claims, 10 Drawing Sheets

IMAGE READING APPARATUS

BACKGROUND OF THE INVENTION

1. Field of the Invention

The present invention relates to an image reading apparatus for reading an image of a document.

2. Description of Related Art

There is an image reading apparatus for reading an image of a document conveyed by a document feeder. A document bundle, which is bound by a stapler for example, may be erroneously set to the image reading apparatus.

Japanese Patent Laid-open Publication No. 2009-51585 discusses an image reading apparatus having a configuration to suspend conveyance of sheets in a case where documents set to the image reading apparatus is bound by a stapler. In Japanese Patent Laid-open Publication No. 2009-51585, two sensors are provided at a downstream side of a separation roller for feeding documents by separating the documents one by one in a direction intersecting with a conveyance direction of the document. The image reading apparatus detects a skew amount of the document based on a difference between passing timings of the leading edge of the document detected by the two sensors, determines that the documents are stapled if the skew amount is larger than a predetermined threshold, and suspends a conveyance operation for conveying the document. In the configuration to suspend conveyance of the document in a case where the skew amount of the document is larger as it is discussed in Japanese Patent Laid-open Publication No. 2009-51585, the following issue may occur if the documents having different sizes in a width direction orthogonal to the conveyance direction of the document are mixedly placed on a paper feed tray of the document feeder.

In a case where documents having different sizes in the width direction are mixed (hereinafter referred to as mixture of different widths), large skews of the documents may occur when the documents are fed from the paper feed tray. This is because, positions of side regulating plates which are accommodated in the paper feed tray for regulating both sides of the documents in the width direction is fixed according to a document having the largest size in the width direction among the documents of the document bundle set in the paper feed tray. Among the documents of the document bundle of a mixture of different widths, the document having the largest size in the width direction is fed such that both sides of the document is regulated by the side regulating plates when it is fed, whereas the document having a relatively smaller size in the width direction tends to be skewed since the document is not regulated by the side regulating plates from both sides.

Accordingly, in a case where the documents having different widths are fed, an erroneous determination that the documents are bound might be made since a large skew occurs in the document having narrower width although the document is actually not stapled by a stapler.

SUMMARY OF THE INVENTION

The present invention is directed to an image reading apparatus capable of avoiding an erroneous detection that documents which are not bound are erroneously considered as bound documents.

According to an aspect of the present invention, an image reading apparatus includes a stacking unit on which documents are stacked in, a regulating unit configured to regulate an edge of the document in a width direction orthogonal to a conveyance direction of the document stacked in the stacking unit, a separation-feeding unit configured to separate and feed the document stacked in the stacking unit, a reading unit configured to read an image of the document fed by the separation-feeding unit, a leading edge detecting unit configured to detect a leading edge of the document fed by the separation-feeding unit, a setting unit configured to set that a plurality of documents stacked in the stacking unit are a mixture of different widths, i.e., are different in size in the width direction, and a control unit configured to suspend an operation of the separation-feeding unit in feeding operation in a case where the control unit determines that an inclined amount of the leading edge of the fed document based on a signal from the leading edge detecting unit is larger than a setting value, and to set, in a case where a mixture of different widths is set to the setting unit, the setting value larger in comparison with a case where a mixture of different widths is not set.

According to the present invention, the erroneous detection that the documents that are not bound are erroneously detected as the bound documents, resulting in suspending the feeding operation, can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment of an image reading apparatus of the present invention is described below with reference to FIG. 1. The image reading apparatus includes a reader unit 150 as a reading unit for reading an image of a document and an auto document feeder (ADF) 2 provided above the reader unit 150.

Figure 1:
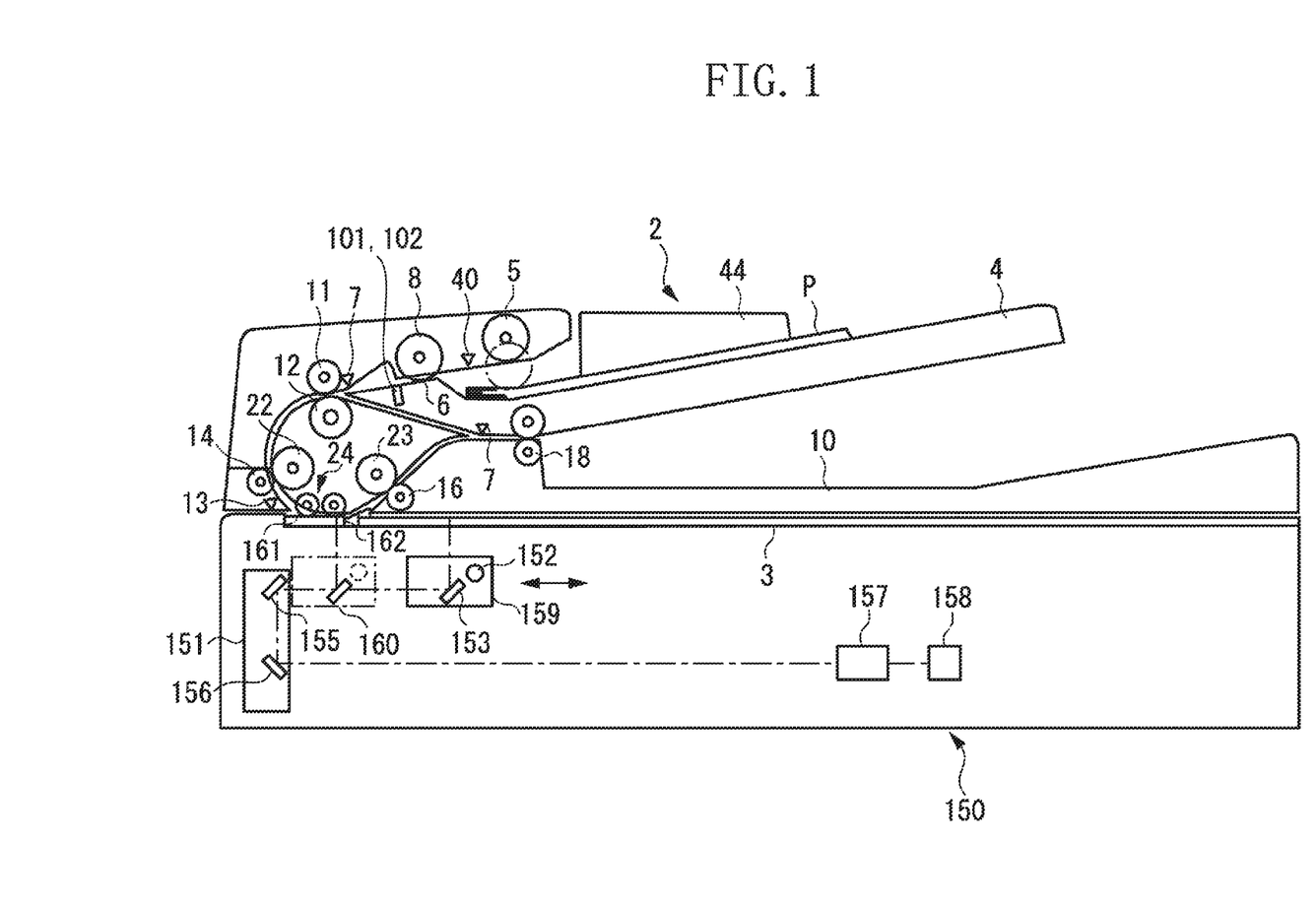
FIG. 1 illustrates an image reading apparatus according to an exemplary embodiment of the present invention.

In FIG. 1, the reader unit 150 includes a lamp 152 that emits light to a surface of the document, a first optical bench 159 provided with a first mirror 153 that reflects reflected light from the document, the reflected light corresponding to the light emitted from the lamp 152. The reader unit 150 includes a second optical bench 151 having a second mirror 155 and a third mirror 156 for reflecting the reflected light from the first mirror 153. A document positioning glass plate 3 and a platen glass 161 are provided in an upper section of the reader unit 150. A lens 157 and a charge coupled device (CCD) 158 as an image reading unit are provided inside the reader unit 150.

The reflected light from a document P is guided to the lens 157 through the first mirror 153, the second mirror 155, and the third mirror 156. The reflected light is condensed on the CCD 158 by the lens 157. The CCD 158 photoelectrically converts the reflected light reflecting document information to output it in the form of an electronic image signal.

The image reading apparatus can read the image of the document in a fixed document reading mode for reading image information of the document while the document is fixedly placed on the document positioning glass plate 3, and the first optical bench 159 and the second optical bench 151 are moved in a sub-scanning direction. The image reading apparatus can read the image of the document in a conveyed document reading mode for reading image information of the document conveyed by the ADF 2 described below in a state that the first optical bench 159 is stopped at a document reading position 160.

Now, the ADF 2 is described below. In FIG. 1, a paper feed tray 4 as a stacking unit stacks a plurality of pages of documents of a sheet type. In the paper feed tray 4, a pair of width direction regulating plates 44, as a regulating unit, is slidably located in the width direction of the document. The width direction of the document here is a direction orthogonal to a conveyance direction of the document in the ADF 2 and along a surface of the document set in the paper feed tray 4. Both sides of the document P stacked in the paper feed tray 4 are regulated in the width direction by the width direction regulating plates 44, so that stability in feeding of the document P can be secured.

A feeding roller 5 is provided above the paper feed tray 4. The feeding roller 5 rotates in association with a rotation drive of a separation-feeding roller 8 to feed the document P. The feeding roller 5 is normally positioned above the paper feed tray 4 at a retracted position, i.e., home position, (i.e., a position illustrated by a solid line in FIG. 1) so as not to bother a user who sets the documents in the paper feed tray 4. When the feeding operation starts, the feeding roller 5 moves down to a dotted line position in FIG. 1 to be brought into contact with an upper surface of the document P. The feeding roller 5 is pivotally supported by an arm (not illustrated), so that the feeding roller 5 can be moved up and down by swinging the arm.

A separating pad 6 is positioned at a side facing to the separation-feeding roller 8 in order to apply a pressure to a side of the separation-feeding roller 8 serving as a separation-feeding unit. The separating pad 6 is formed of, for example, a rubber member having a friction force slightly smaller than that of the separation-feeding roller 8. The separating pad 6 separates the documents P fed by the feeding roller 5 sheet by sheet and thus separated document is further fed by the separation-feeding roller 8. The separation-feeding roller 8 and the separating pad 6 are mounted on the paper feed tray 4 and act over a central area in the width direction of the document P, which is stacked in the paper feed tray 4 and whose both sides are regulated by the width direction regulating plates 44.

A first sensor 101 and a second sensor 102 for detecting a leading edge of the document P fed by the separation-feeding roller 8 are provided at a downstream side of a contact portion where the separating pad 6 contacts the separation-feeding roller 8 in the conveyance direction of the document. The first sensor 101 and the second sensor 102 are provided for detecting a skew amount of the document P (i.e., inclined amount of the leading edge of the document P), which are described in detail below.

Figure 7:
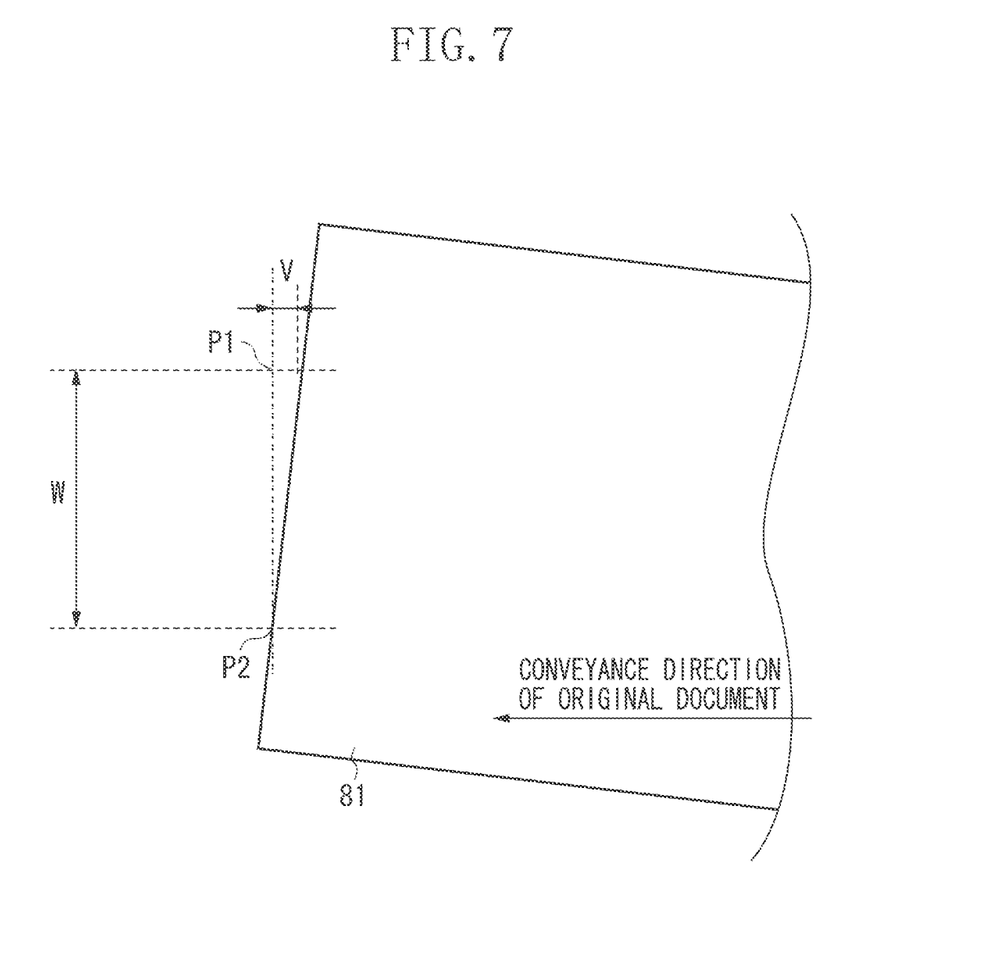
FIG. 7 illustrates a skew of a document.

The skew amount (i.e., inclined amount of the leading edge) is described with reference to a top view in FIG. 7 illustrating a document 81 conveyed in the conveyance direction of the document with the leading edge skewed. Two points P1 and P2 are spaced by a distance W apart in the width direction orthogonal to the conveyance direction of the document. A difference of the positions of the leading edge of the document in the conveyance direction at positions corresponding to the positions P1 and P2 is defined as a value V. The skew amount of the document in the present application is represented by a value of V/W.

A registration roller 12 and a registration driven roller 11 form a registration unit that corrects the skew of the document P which is separated and fed by the separation-feeding roller 8. The separation-feeding roller 8 brings the leading edge of the document P into contact with a nip portion between the registration roller 12 that stop rotation and the registration driven roller 11, so that the document P forms a loop and the leading edge thereof is aligned. Accordingly, the skew of the document P can be corrected. When the registration roller 12 is rotated, the document P whose skew is corrected is conveyed to the downstream side by the registration roller 12.

The document P conveyed by the registration roller 12 is further conveyed toward a platen glass 161 by a lead roller 22 and a lead driven roller 14 as a conveyance rotating member. The document P is still further conveyed by a lead discharging roller 23 and a lead discharging driven roller 16 as a discharge rotating member. A jumping plate 162 guides the document P such that the document P is scooped up from the platen glass 161.

The document P conveyed by the ADF 2 is conveyed to a position facing to the platen glass 161. Accordingly, an image of the document P is read by the reader unit 150. After the image is read, the document P is discharged to a discharge tray 10 by discharge rollers 18.

In a two-sided mode for reading both surfaces of the document P, the document P is not discharged by the discharge rollers 18 but is switched back to be guided to a sheet path positioned above and conveyed toward the registration roller 12. The document P is conveyed toward the platen glass 161 by the registration roller 12. Accordingly, a rear surface of the document P is read in a similar manner as described above.

Now, the separation-feeding roller 8, and the first sensor 101 and the second sensor 102 constituting a leading edge detecting unit are described with reference to FIG. 2.

Figure 2:
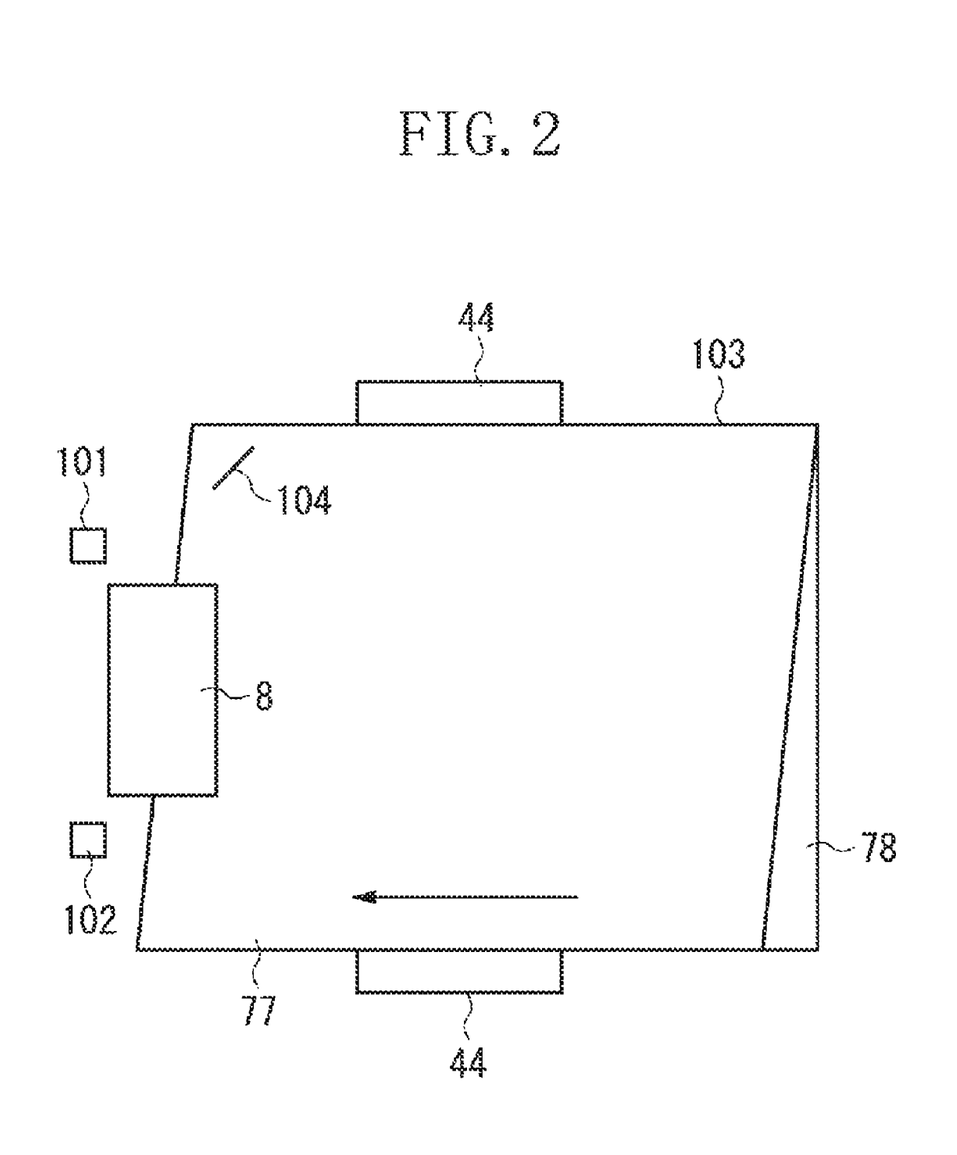
FIG. 2 illustrates a skew amount detecting unit in the image reading apparatus according to the exemplary embodiment of the present invention.

FIG. 2 is a schematic planer view illustrating a state that documents bound by a binding member, e.g., a stapler, are fed. A set of stapled documents 103 including a plurality of sheets of the documents of which upper left portion are bound by a binding member 104, e.g., a stapler, is placed on the paper feed tray 4. Documents including a plurality of sheets of the documents that are bound by the binding member 104 is hereinafter referred to as stapled documents for the sake of an explanation.

The first sensor 101 and the second sensor 102 are optical sensors for detecting the leading edge of the document P fed by the separation-feeding roller 8. In the present exemplary embodiment, the first sensor 101 and the second sensor 102 are arranged on a line parallel to a rotation shaft of the separation-feeding roller 8. The arrangement of the first sensor 101 and the second sensor 102 on the line parallel to the rotation shaft of the separation-feeding roller 8 enables the first sensor 101 and the second sensor 102 to detect the leading edge of the document P at the same timing if there is no skew of the document.

Therefore, the arrangement of the first sensor 101 and the second sensor 102 on the line parallel to the rotation shaft of the separation-feeding roller 8 makes it easier to calculate the skew amount of the document P. However, the present invention is not limited to the above described exemplary embodiment. The present invention may include a configuration that the first sensor 101 and the second sensor 102 are not arranged on the line parallel to the rotation shaft of the separation-feeding roller 8.

A distance between the first sensor 101 and the second sensor 102 is made narrower than a width of a document with a conveyable smallest size. The first sensor 101 and the second sensor 102 arranged side by side in the width direction as sensors constituting the skew amount detecting unit for detecting the skew amount of the document (i.e., inclined amount of the leading edge of the document) are exemplified here. However, any type of the skew amount detecting unit, for example, a contact image sensor (CIS) that extends in a direction orthogonal to the conveyance direction of the document to detect the leading edge thereof can be used as far as a state of the skew of the document can be detected.

A principle of detecting that a set document bundle is stapled documents by the first sensor 101 and the second sensor 102 is described below with reference to FIG. 2 illustrating a state that the uppermost document 77 of the stapled documents 103 is fed by the separation-feeding roller 8.

The uppermost document 77 is bound by the binding member 104. Thus, when the separation-feeding roller 8 feeds the uppermost document 77, the uppermost document 77 revolves around the binding member 104 on a document 78 therebelow other than the uppermost document 77. The uppermost document 77 in revolving is recognized as a document having a large skew amount (i.e., inclined amount of the leading edge) by signals from the first sensor 101 and the second sensor 102. As described above, a determination is made as to whether the documents are stapled according to the skew amount of the detected document P based on the signals from the first sensor 101 and the second sensor 102.

Figure 3A:
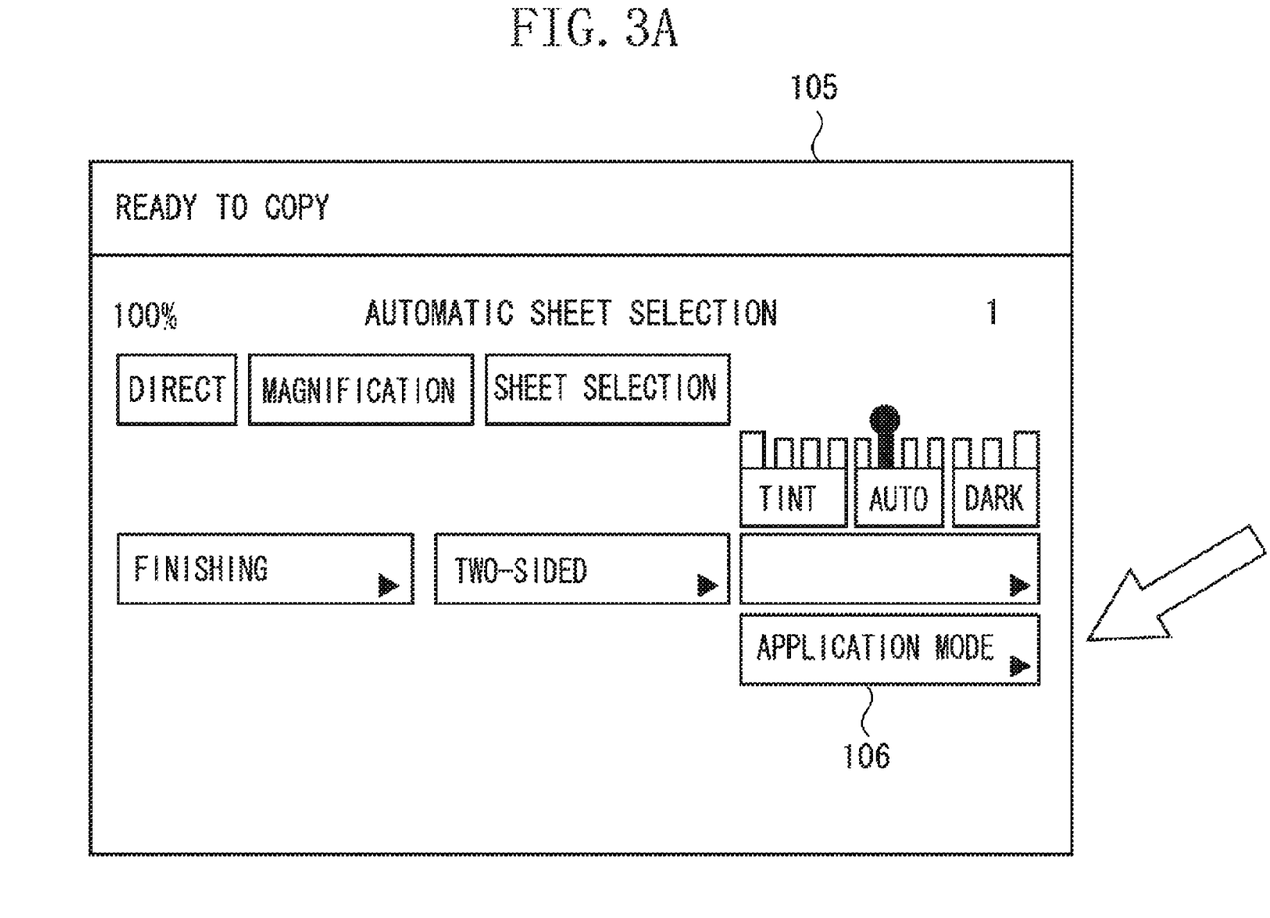
FIGS. 3A through 3C illustrate a different-width-mixture-document setting unit according to the exemplary embodiment of the present invention, respectively.
Figure 3B:
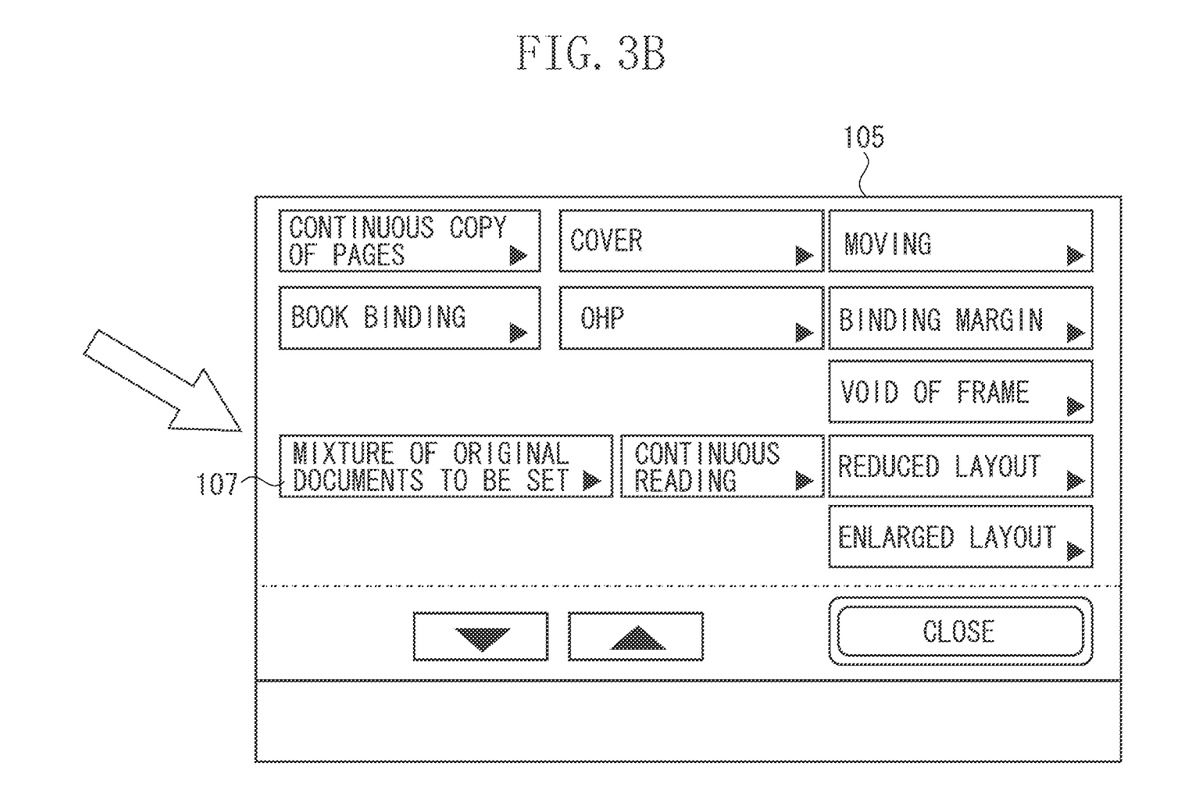
Figure 3C:
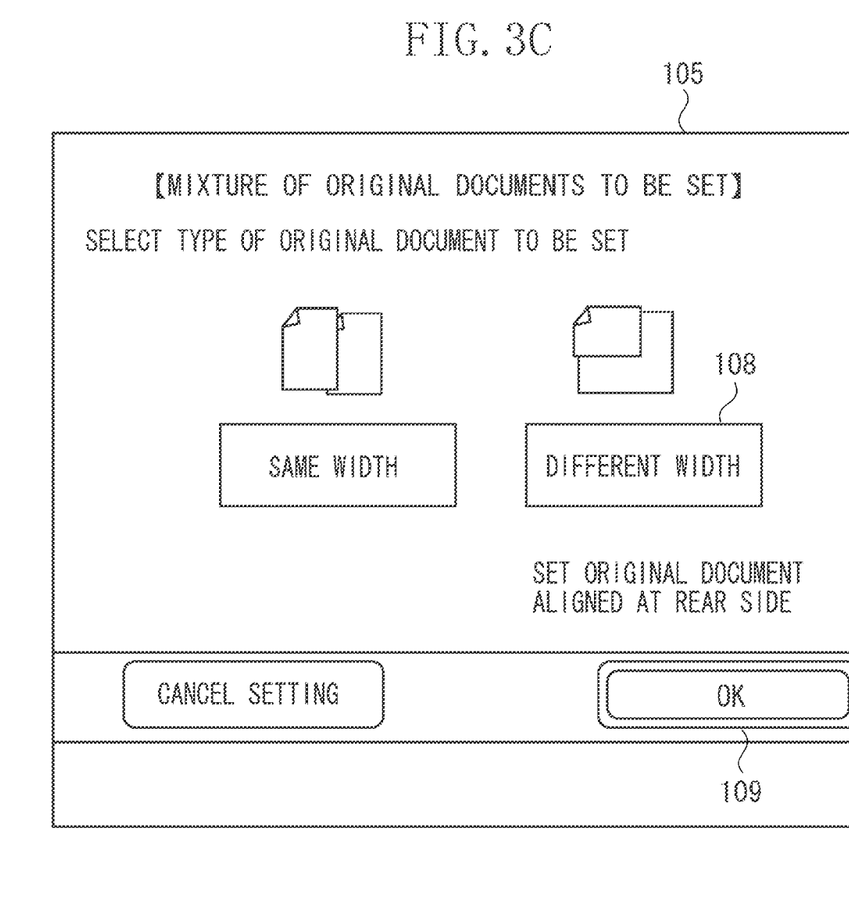

Now, setting of a different-width-mixture-document-passing (i.e., different-width-mixture-document mode) in which documents having different sizes orthogonal to the conveyance direction are conveyed in mixture is described with reference to FIG. 3.

An operation display unit 105 is provided on the image reading apparatus. A user sets the different-width-mixture-document mode via the operation display unit 105. More specifically, when the user selects an application mode key 106 of the operation display unit 105 in a standby screen illustrated in FIG. 3A, the screen is switched to an application mode screen in FIG. 3B. In the application mode screen of the operation display unit 105, when the user selects a document mixture key 107 in the screen, the screen is switched to a setting screen for setting a document mixture mode illustrated in FIG. 3C. In the setting screen for setting the document mixture mode, the user selects a different width key 108 and finally presses an OK key 109. Accordingly, information about a mixture of different widths is input into a control unit 110 which is described below with reference to FIG. 4A.

In the present exemplary embodiment, after selecting the different width key 108 and selecting the OK key 109 in the document mixture mode setting screen, the operation display unit 105 further displays a guidance for prompting the user to set the documents in a manner as described below.

In other words, the operation display unit 105 displays the guidance for prompting the user to set a document bundle in the paper feed tray 4 after aligning upper edge of the document bundle including the documents of different widths. The upper edge of the document bundle means an edge in parallel with the conveyance direction of the document (i.e., edge intersecting with the width direction), more specifically, an edge of a rear side of the apparatus when the document bundle is set in the paper feed tray 4. According to the display, the user is guided to set the document bundle in the paper feed tray 4 with the upper edge of the document bundle aligned.

In the mixed documents, when the document having a width narrower than the largest width is fed, the document is fed while one of a pair of width direction regulating plates 44, which contacts the upper edge of the document, regulates a position of the document. As described above, the regulation of the position of the upper edge of the document produces an effect for suppressing the skew for a certain level. However, in comparison with a case that both sides of the document are regulated by the width direction regulating plates 44, the skew tends to occur while the document is fed.

Figure 4A:
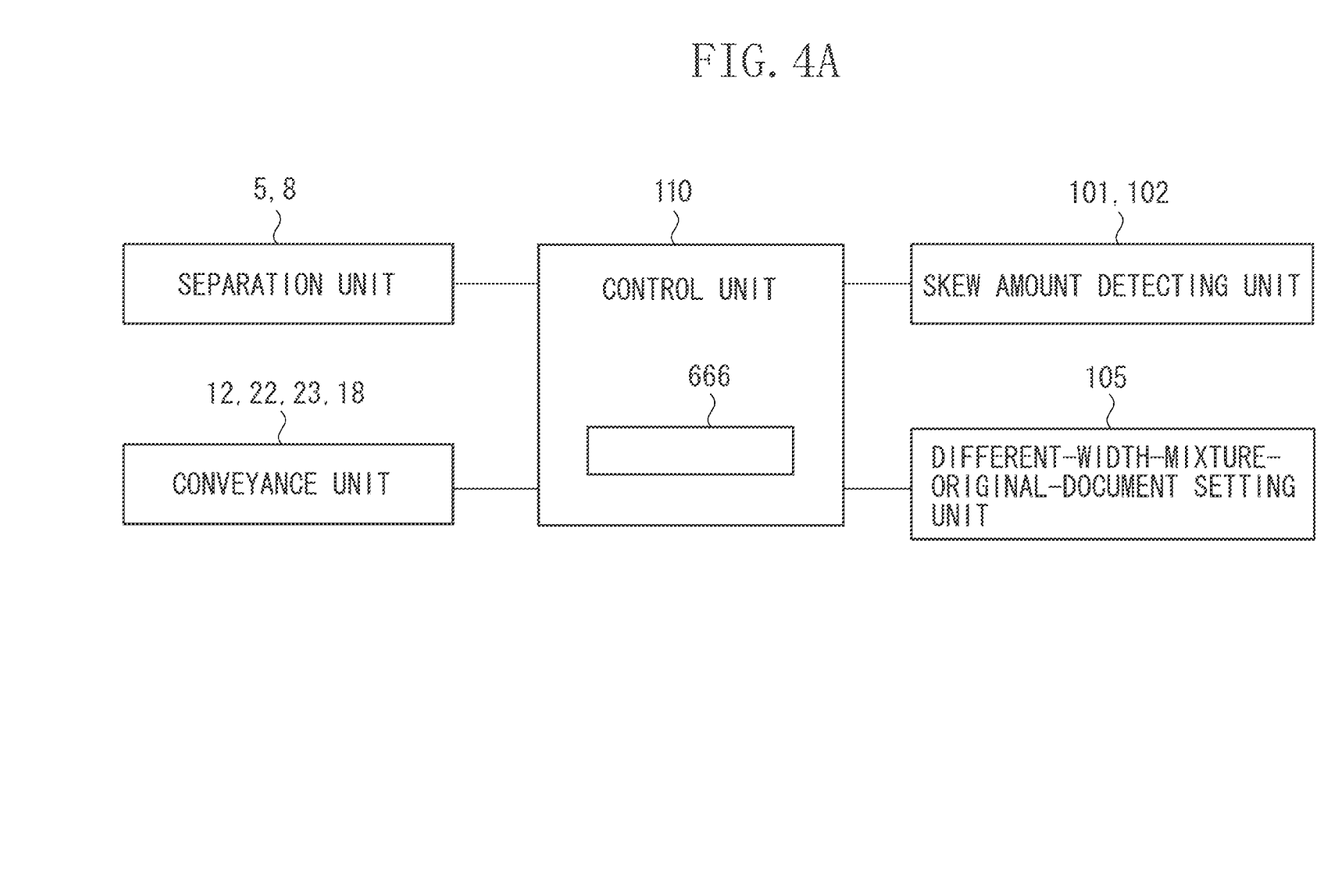
FIGS. 4A and 4B are block diagrams according to the exemplary embodiments of the present invention, respectively.

FIG. 4A is a block diagram illustrating a configuration of the control unit according to the first exemplary embodiment. The control unit 110 which includes a read-only memory (ROM), a random access memory (RAM), and a timer 666 controls operations of the separation-feeding unit including the feeding roller 5 and the separation-feeding roller 8, and the document conveyance unit including the registration roller 12, the lead roller 22, the lead discharging roller 23, and the discharge rollers 18.

Information from a different-width-mixture-document setting unit that includes the skew amount detecting unit having the first sensor 101 and the second sensor 102 and the operation display unit 105 is input into the control unit 110. The control unit 110 also controls a screen display of the above described operation display unit 105. Although not illustrated, the control unit 110 also controls a reading operation of the reader unit 150.

Figure 5:
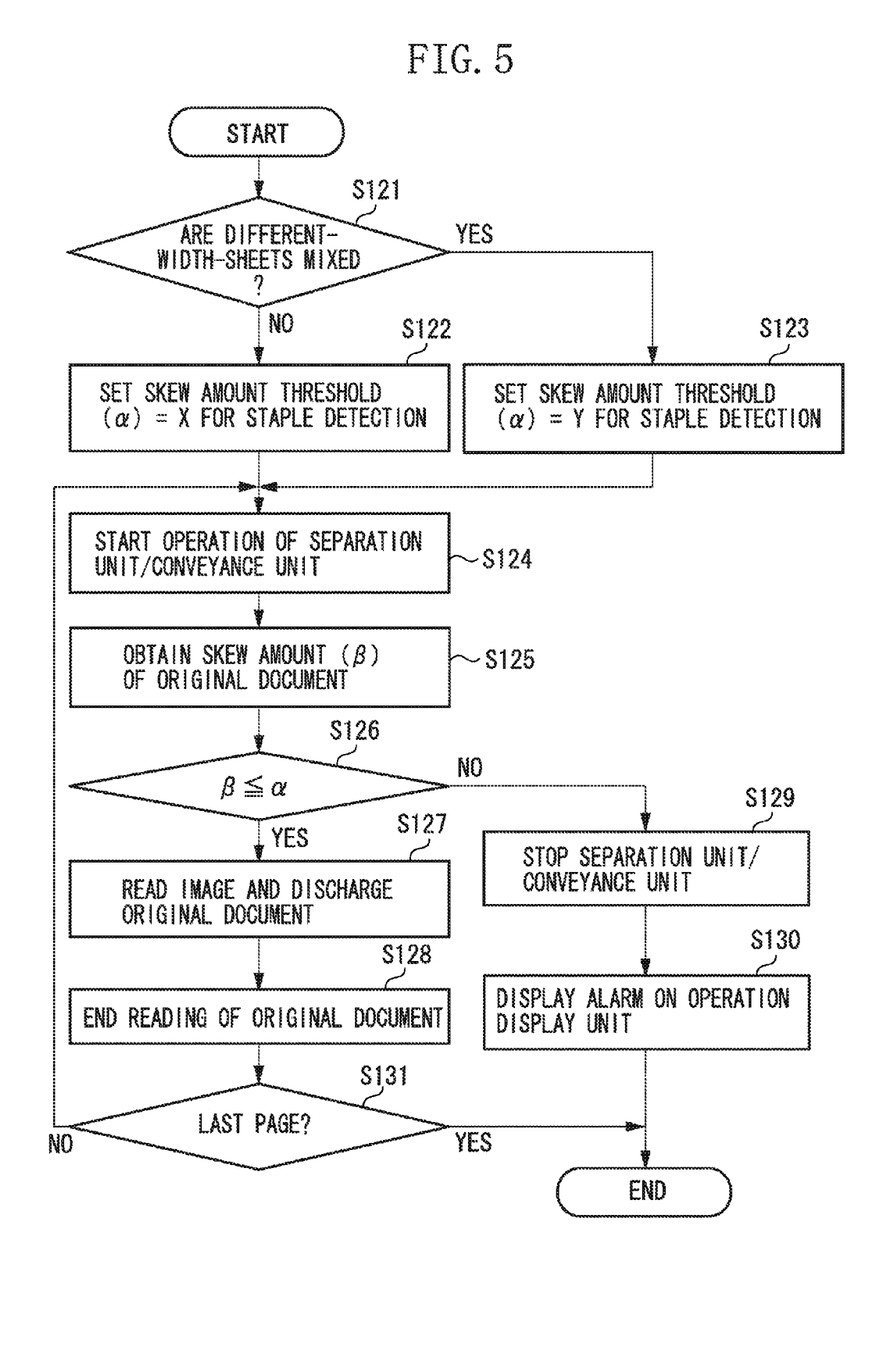
FIG. 5 is a flow chart according to a first exemplary embodiment of the present invention.

The control performed by the control unit 110 is described below with reference to a flow chart in FIG. 5. The following operations are performed by the control unit 110 controlling each unit based on a determination by the control unit 110.

In step S121, the control unit 110 checks whether a different-width-mixture-document setting is made based on the input from the operation display unit 105. More specifically, the control unit 110 determines whether the different-width-mixture-document setting is performed on the operation display unit 105 and the information indicating a mixture of different widths is input from the operation display unit 105.

If it is not determined as the different-width-mixture-document setting (NO in step S121), in step S122, the control unit 110 sets a skew amount threshold ($\alpha$) to X, and stores the set value in the RAM. The skew amount threshold ($\alpha$) is a setting value for staple detecting. On the other hand, if it is determined as the different-width-mixture-document setting (YES in step S121), in step S123, the control unit 110 sets the skew amount threshold ($\alpha$) to Y, which is larger than X, and stores the set value in the RAM.

In step S124, the control unit 110 rotates the feeding roller 5 and the separation-feeding roller 8 to start the separation conveyance of the documents.

In step S125, based on the signals obtained from the first sensor 101 and the second sensor 102, the control unit 110 acquires information about a time difference between detection of the document leading edge by the first sensor 101 and detection of the document leading edge by the second sensor 102, that corresponds to an actual skew amount (β) of the conveyed document.

The control unit 110 recognizes the actual skew amount of the conveyed document based on a time period from when the leading edge of the document passes through either one of the first sensor 101 and the second sensor 102 and when the leading edge of the document passes through the other one of the first sensor 101 and the second sensor 102. The control unit 110 determines whether the inclined amount of the leading edge of the fed document is larger than the set value according to whether the time difference between timings for detecting the leading edge of the document by the first sensor 101 and the second sensor 102, respectively, is within a range of a prescribed value.

In step S126, the control unit 110 compares the skew amount threshold (α) with the actual detected skew amount (β) of the document based on the signals from the first sensor 101 and the second sensor 102.

If it is determined that the skew amount (β) of the document is equal to or less than the skew amount threshold (α) corresponding to the prescribed value (YES in step S126), the control unit 110 determines that the conveyed documents are not stapled. In step S127, the control unit 110 discharges the document to the outside of the apparatus after reading the image thereof, and, in step S128, ends the reading operation. In step S131, if the operation is completed to the last page of the documents (YES in step S131), the processing is ended. If not (NO in step S131), the processing returns to step S124.

In step S126, if it is determined that the actual skew amount (β) of the document is larger than the skew amount threshold (α) (NO in step S126), the control unit 110 determines that the fed documents are stapled. In step S129, the control unit 110 stops the rotations of the feeding roller 5, the separation-feeding roller 8, the registration roller 12, and the like, in feeding operation in order not to advance the documents assumed to be stapled any further. In step S130, the control unit 110 causes the operation display unit 105 to display a content indicating that the documents are stapled (i.e., alarm display).

Now, the values X and Y set as the skew amount threshold (a) are described.

The control unit 110 calculates the largest skew amount that may occur in the case documents, which are not a mixture of different widths and are not stapled, are conveyed in advance by performing an experiment or the like. The control unit 110 sets X to a value larger than the largest skew amount that may occur in the case the documents, which are not the mixture of different widths and are not stapled, are conveyed. In other words, X is set to a value such that the documents can be considered as stapled documents if the skew equal to or larger than X occurs when the documents are not the mixture of different widths.

The control unit 110 calculates the largest skew amount that may occur in the case documents, which are a mixture of different widths and are not stapled, are conveyed in advance by performing an experiment or the like. The control unit 110 sets Y to a value larger than the largest skew amount that may occur in the case the documents, which are the mixture of different widths and are not stapled, are conveyed. In other words, Y is set to a value such that the documents can be considered as stapled documents if the skew equal to or larger than Y occurs when the documents are the mixture of different widths.

The largest skew amount that may occur in a case where the documents are a mixture of different widths is larger than the largest skew amount that may occur in a case where the documents are not a mixture of different widths. This is because, in the documents of the mixture of different widths, positions of the width direction regulating plates 44 provided to the paper feed tray 4 are fixed according to the document having relatively wider side, so that documents having relatively narrower widths are regulated only one side thereof. Therefore, the documents having relatively narrower widths tend to skew.

The reason why the threshold is set to a value larger than the largest skew amount that may occur, i.e., that is calculated in advance by the experiment or the like, is as follows. The reason is to securely avoid erroneously determining that the documents are stapled although the documents are actually not stapled. In other words, the erroneous detection that determines that the documents are stapled although the documents are not stapled can be avoided by setting the threshold to a value larger than the largest skew amount that may occur, i.e., that is calculated in the experiment or the like.

In order to enhance accuracy for detecting the presence of a staple in a case where there actually is a staple, the threshold is preferably set to a smaller value. For example, if the documents are bound at a side of rear ends thereof (i.e., upstream end in the conveyance direction) and at a position close to a center in the width direction of the documents stacked in the paper feed tray 4, a revolving amount of the documents around the binding member becomes smaller.

More specifically, there may be a case where only a small amount of skew occurs according to a binding position or the like of the stapled documents. Therefore, a smaller threshold is preferable in securely recognizing the presence of the staple if there actually is the staple. In order to more accurately determine the presence of the staple if there actually is the staple, the threshold is set as small as possible in both of a case of not the different-width-mixture-document setting and a case of the different-width-mixture-document setting.

Therefore, in the first exemplary embodiment, the threshold is sets to a value as small as possible regardless of the presence or absence of the different-width-mixture-document setting, and the setting is made so as to be X<Y in order to securely avoid the erroneous determination that the unstapled documents are erroneously considered as the stapled documents.

Now, a second exemplary embodiment is described. In the above described first exemplary embodiment, the control unit 110 determines whether the skew amount of the document is larger than the threshold by actually detecting the skew amount of the document (i.e., inclined amount of the leading edge of the document) to compare it with the threshold. In the second exemplary embodiment, a method for determining whether the skew amount of the conveyed document is larger than the threshold differs from that of the first exemplary embodiment. Configurations different from those of the first exemplary embodiment are described below in detail. Detailed descriptions of the configurations identical to those of the first exemplary embodiment are omitted here.

Figure 4B:
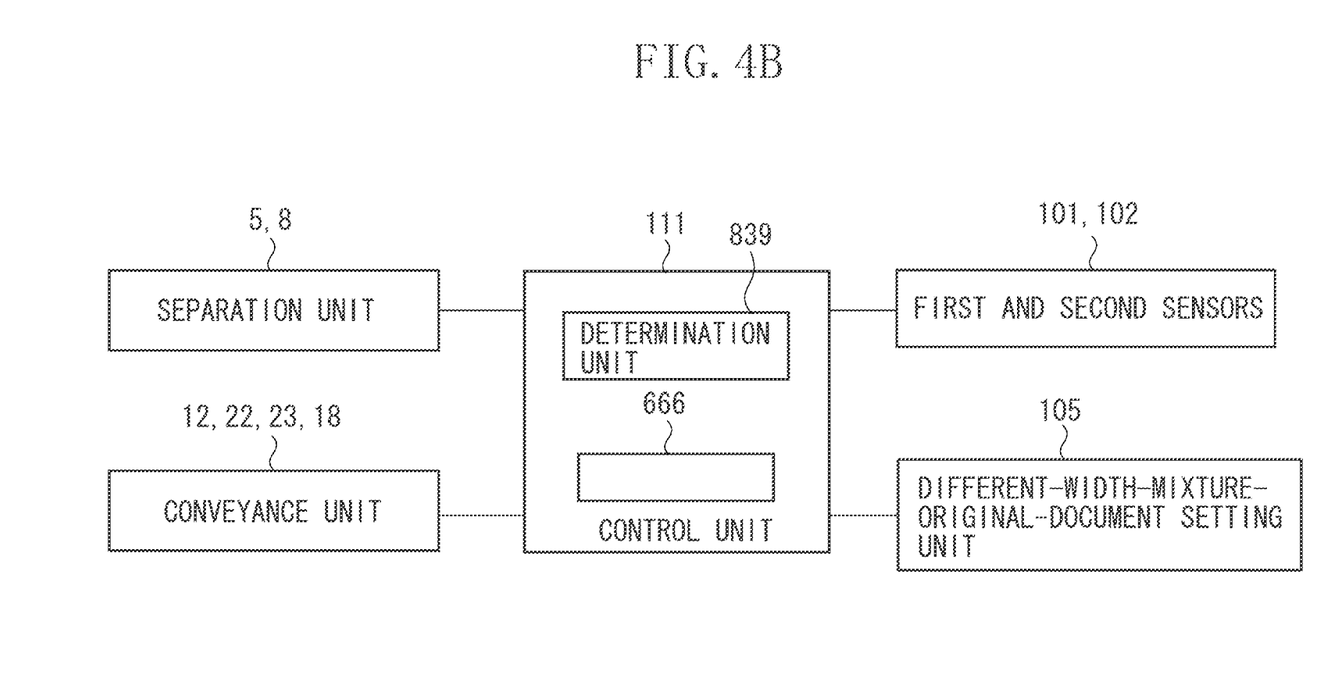

FIG. 4B is a block diagram illustrating a configuration of a control unit 111 according to the second exemplary embodiment. The control unit 111 including the ROM, the RAM, and the timer 666 controls operations of the separation-feeding unit and the document conveyance unit. Information of the signals from the first sensor 101 and the second sensor 102 are input into a determination unit 839 included in the control unit 111. As described below, the determination unit 839 determines whether the specified setting time has elapsed after one of the first sensor 101 or the second sensor 102 detects the leading edge of the document and before the other sensor detects the leading edge of the document has passed.

Figure 6:
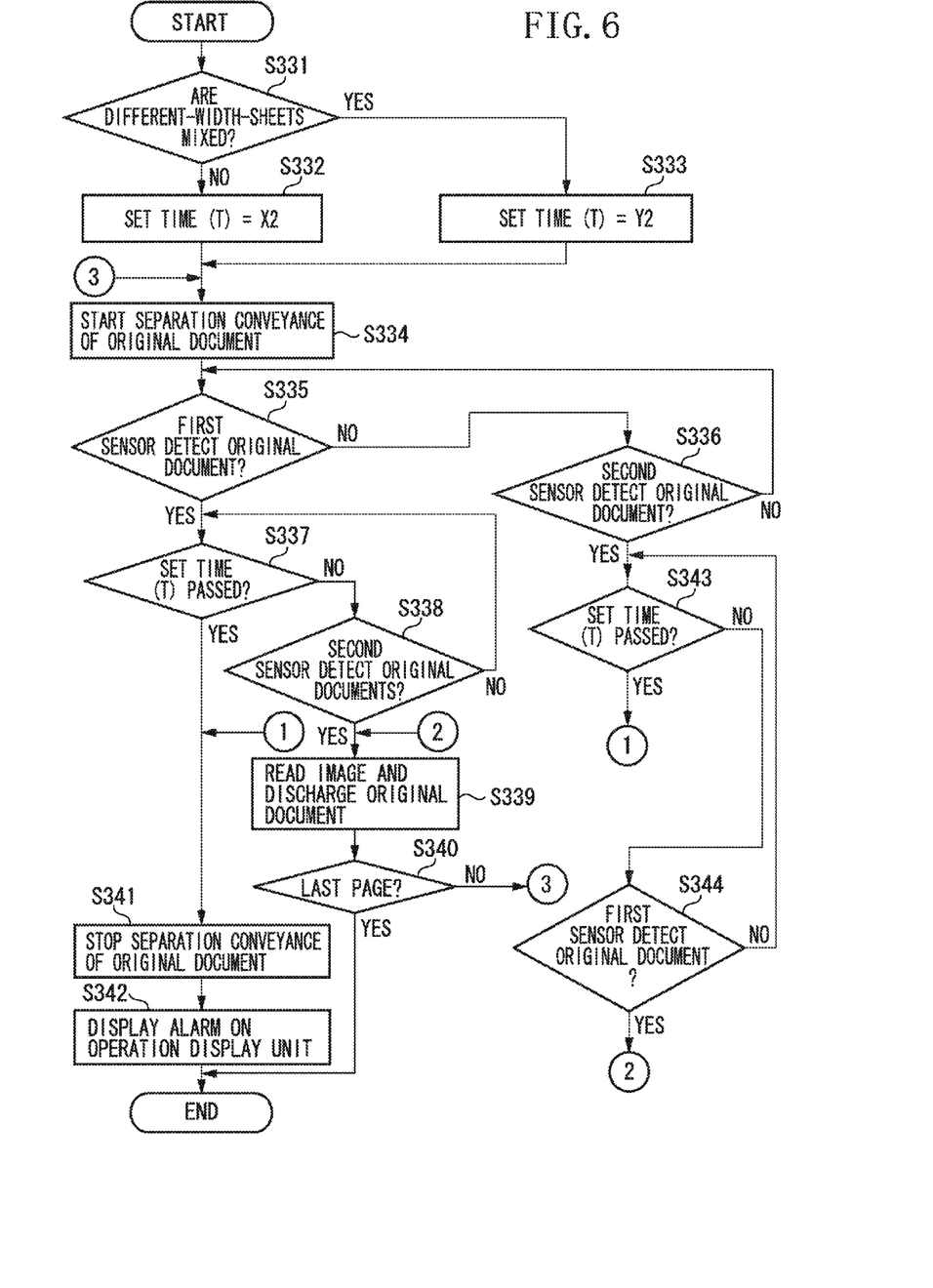
FIG. 6 is a flow chart according to a second exemplary embodiment of the present invention.

Control performed by the control unit 111 in the second exemplary embodiment is described below with reference to a flow chart of FIG. 6. The following operations are performed by the control unit 111 that controls each unit based on the determination of the control unit 111.

In step S331, the control unit 111 checks whether the different-width-mixture-document setting is made. If it is not determined as the different-width-mixture-document setting (NO in step S331), in step 5332, the control unit 111 sets a setting time (T) as a setting value for detecting a staple to X2, and stores the set value. If it is determined as the different-width-mixture-document setting (YES in step S331), in step S333, the control unit 111 sets the setting time (T) as a setting value for detecting a staple to Y2 that is larger than X2, and stores the set value.

In step S334, the control unit 111 rotates the feeding roller 5 and the separation-feeding roller 8 to start the separation conveyance of the documents.

In step S335, the control unit 111 determines whether the first sensor 101 detects the leading edge of the document having been separately fed. If the first sensor 101 does not detect the document having been separately fed (NO in step S335), then in step S336, the control unit 111 determines whether the second sensor 102 detects the document having been separately conveyed.

In step S335, if the control unit 111 determines that the first sensor 101 detects the document having been separately conveyed (YES in step S335), in step S337, the control unit 111 determines whether the setting time (T) has passed after the first sensor 101 detects the document. Whether the setting time (T) has passed is determined by the control unit 111 by using the timer 666. If the setting time (T) has not passed after the first sensor 101 detects the document (NO in step S337), in step S338, the control unit 111 determines whether the second sensor 102 detects the document.

The determination unit 839 of the control unit 111 determines whether the second sensor 102 detects the document (YES in step S338) within the setting time (T) (NO in step S337). If the second sensor detects the document (YES in step S338) within the setting time (T) (NO in step S337), the skew amount of the conveyed document is smaller than the threshold, so that the control unit 111 determines that the documents are not stapled.

In step S339, the control unit 111 executes control to perform the document reading operation and the document conveyance operation. In step S340, if the operation is completed to the last page of the documents (YES in step S340), the processing is ended. If not (NO in step S340), the processing returns to step S334.

On the other hand, if the setting time (T) has passed (YES in step S337) while the second sensor 102 does not detect the document (NO in step S338), the skew amount of the conveyed document is a value equal to or more than the threshold, so that the control unit 111 determines that the documents are stapled.

Then in step S341, the control unit 111 stops the rotations of the feeding roller 5, the separation-feeding roller 8, the registration roller 12, and the like in operation. In step S342, the control unit 111 causes the operation display unit 105 to display a notice indicating that the set documents are stapled (i.e., alarm display).

In step S335, if it is determined that the first sensor 101 does not detect the document (NO in step S335) but, in step 5336, it is determined that the second sensor 102 detects the document (YES in step S336), i.e., in a case where the second sensor 102 detects the leading edge of the document earlier than the first sensor 101, the processing proceeds to step S343.

In step S343, the control unit 111 determines whether the setting time (T) has passed after the second sensor 102 detects the document. If the setting time (T) has not passed after the second sensor 102 detects the document (NO in step S343), in step S344, the control unit 111 determines whether the first sensor 101 detects the document. In step S344, if the control unit 111 determines that the first sensor 101 does not detect the document (NO in step S344), the processing returns to step S343.

The determination unit 839 of the control unit 111 determines whether the second sensor 102 detects the document (YES in step S336) within the setting time (T) as a prescribed time (NO in step S343). If the first sensor 101 detects the document (YES in step S344) within the setting time (T) (NO in step S343), the control unit 111 determines that the documents are not stapled since the skew amount of the conveyed document is smaller than the threshold.

In step S339, the control unit 111 executes control to perform the document reading operation and the document conveyance operation. In step S340, if the operation is completed to the last page of the documents (YES in step S340), the processing is ended. If not (NO in step S340), the processing returns to step S334.

If the setting time (T) has passed (YES in step S343) while the first sensor 101 does not detect the document (NO in step S344), the skew amount of the conveyed document is equal to or larger than the threshold. Therefore, the control unit 111 determines that the documents are stapled.

Then in step S341, the control unit 111 stops the rotations of the feeding roller 5 and the separation-feeding roller 8 in operation. In step S342, the control unit 111 causes the operation display unit 105 to display a notice indicating that the set documents are stapled (i.e., alarm display).

As described above, the control unit 111 determines whether the skew amount of the conveyed document (i.e., inclined amount of the leading edge of the document) is larger than the threshold based on the signals acquired from the first sensor 101 and the second sensor 102. The control unit 111 suspends the feeding operation if it is determined that the skew amount of the document is larger than the threshold.

The values X2 and Y2 to be set as the setting time (T) that is the threshold of the skew amount are described.

A distance between the first sensor 101 and the second sensor 102 arranged at the downstream side of the separation-feeding roller 8 is set to L (mm). In the present exemplary embodiment, the distance L between the first sensor 101 and the second sensor 102 is 100 mm. A difference of positions of the leading edge of the document in the conveyance direction at positions in the width direction with respect to each of the sensors 101 and 102 while the leading edge of the conveyed document is skewed is A (mm). The skew amount of the document is defined as A/L.

In the experiment, in a case where documents are not stapled and are not a mixture of different widths, the difference of positions of the leading edge of the document in the conveyance direction at positions in the width direction with respect to the sensors 101 and 102, the difference occurring due to the skew of the document, was less than 1 mm. The possible skew amount occurring in a case where the documents are not stapled and are not a mixture of different widths is less than 1/100. If the documents are not stapled and are a mixture of different widths, the difference of the positions of the leading edge of the document in the conveyance direction at positions in the width direction with respect to the sensors 101 and 102, the difference occurring due to the skew of the document, was less than 5 mm. Accordingly, the possible skew amount in a case where the documents are not stapled and are a mixture of different widths is less than 5/100.

According to the experiment, if the document is bound under a general stapling condition, when a difference of the positions of the leading edge of the document in the conveyance direction at the positions in the width direction with respect to the sensors 101 and 102 becomes about 4 mm skew, the document starts to be broken. In other words, in the general stapling condition, timing at which the document starts to be broken by the binding member 104 of the document is when the skew amount is about 4/100.

In view of the above, X2 is set to a time corresponding to the skew amount 3/100 and the Y2 is set to a time corresponding to the skew amount 5/100, respectively. The following is an example of the time corresponding to the skew amount 3/100 that is set as X2. More specifically, it is a time difference between a time at which one of the first sensor 101 and the second sensor 102 detects the leading edge of the conveyed document and a time at which the other sensor detects the leading edge of the conveyed document when the document is conveyed at the skew amount 3/100. The time can be calculated by using the skew amount 3/100 and the conveyance speed of the separation-feeding roller 8.

Similarly, the time corresponding to the skew amount 5/100 to be set as Y2 can be calculated by using the skew amount 5/100 and the conveyance speed of the separation-feeding roller 8. In other words, in a case where, for example, the different-width-mixture-document setting is not made, the feeding operation of the document that skews by an amount larger than the skew amount 3/100 is suspended. On the other hand, in a case where the different-width-mixture-document setting is made, a continuous feeding operation of the document is allowed even if the skew amount is larger than the skew amount 3/100 as far as the skew amount does not exceed the skew amount 5/100.

As described above, the setting of the setting time (T) according to the presence or absence of the different-width-mixture-document setting remarkably reduces the erroneous determination that the unstapled documents are erroneously determined as stapled documents in both of a case where the documents are not a mixture of different widths and a case where the documents are a mixture of different widths. This is because the setting time set as the threshold is set to a value larger than the time according to the largest skew amount when the skew occurs in a case of the unstapled documents are fed.

If the documents are not a mixture of different widths, the feeding operation can be suspended before inviting the breakage of the document involved in the sheet feeding with the stapled documents. If the documents are a mixture of different widths and are stapled, the feeding operation can be suspended before the documents are broken or before the breakage of the documents becomes serious.

The following effect can be produced according to the configuration/control of the above described second exemplary embodiment.

The following issue may occur if the threshold (i.e., setting time T) for detecting the stapled documents is set to a relatively larger value so as to handle documents of the different-width-mixture having a larger skew amount that may occur, regardless of the presence or absence of the different-width-mixture-document setting. More specifically, in a case of the different-width-mixture that is not frequently used, the document breakage may occur due to the binding member of the stapled documents.

On the other hand, in the present exemplary embodiment, the threshold (i.e., setting time T) of the skew amount is changed according to the presence or absence of the different-width-mixture-document setting. Therefore, according to the present exemplary embodiment, if the documents are not a mixture of different widths, the feeding operation can be suspended without inviting the breakage of the documents even if the documents are stapled, in addition to the remarkable reduction of the erroneous determination that the unstapled documents are erroneously determined as the stapled documents.

In a case of the different-width-mixture-document setting, Y2 (i.e., time corresponding to the skew amount 5/100) set as the threshold (corresponding to the setting time) is slightly larger than the skew amount 4/100 of the document that is started to be broken by the binding member 104. Therefore, in a case where the different-width-mixture-document setting is made and the stapled documents are set, there remains a possible breakage of the document by the binding member 104 according to the feeding of the document. However, since a case where the different-width-mixture-document setting is made and the stapled documents are set seldom occurs, a serious issue does not occur in view of usability. On the other hand, frequency of the erroneous determination that the unstapled documents are erroneously determined as the stapled documents remarkably reduces.

In the above description, the skew amount A/L at which the document is started to be broken is exemplified about 4/100 for the sake of the reference and the better understanding. However, the skew amount at which the document is started to be broken has no pattern but depends on, for example, a type of staple, a type of document, a bound position, and number of documents. Regardless of the bound state, if a value to be set as the threshold is set to a value as small as possible, the feeding operation of the documents can be suspended earlier. As a result thereof, a risk of a serious document breakage can be reduced more. According to the present exemplary embodiment, the erroneous determination that the unstapled documents are erroneously determined as the stapled documents can be avoided as well as the risk of document breakage due to a binding member can be reduced as much as possible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-251901 filed Nov. 10, 2010, which is hereby incorporated by reference herein in its entirety.

What is claimed is:

1. An image reading apparatus, comprising:
   a stacking unit in which documents are stacked;
   a regulating unit configured to regulate an edge of the document in a width direction orthogonal to a conveyance direction of the document stacked in the stacking unit;
   a separation-feeding unit configured to separate and feed the document stacked in the stacking unit;
   a reading unit configured to read an image of the document fed by the separation-feeding unit;
   a leading edge detecting unit configured to detect a leading edge of the document fed by the separation-feeding unit;
   a setting unit configured to set a mixture of different widths that a plurality of documents stacked in the stacking unit are different in size in the width direction; and a control unit configured to suspend an operation of the separation-feeding unit in feeding operation in a case where the control unit determines that an inclined amount of the leading edge of the fed document based on a signal from the leading edge detecting unit is larger than a setting value, and to set, in a case where a mixture of different widths is set to the setting unit, the setting value larger in comparison with a case where a mixture of different widths is not set.

2. The image reading apparatus according to claim 1,
wherein the leading edge detecting unit includes a first sensor and a second sensor spaced apart from each other in a direction intersecting with the conveyance direction of the document,
wherein the control unit determines that the inclined amount of the leading edge of the document is larger than the setting value to thus suspend an operation of the separation-feeding unit at a time a prescribed time has passed after the first sensor detects the leading edge of the document and before the second sensor detects the leading edge of the document, and
wherein, in a case where a mixture of different widths is set to the setting unit, the prescribed time is set to a larger value in comparison with a case where a mixture of different widths is not set.

3. The image reading apparatus according to claim 1,
wherein the leading edge detecting unit includes a first sensor and a second sensor spaced apart from each other in a direction intersecting with the conveyance direction of the document,
wherein the control unit determines whether the inclined amount of the leading edge of the fed document is larger than the setting value according to whether a time difference between a time the first sensor detects the leading edge of the document and a time the second sensor detects the leading edge of the document is within a range of a prescribed value, and
wherein, in a case where a mixture of different widths is set to the setting unit, the prescribed value is set larger in comparison with the case where a mixture of different widths is not set.

* * * * *